Dec. 11, 1951 G. E. DANIELS 2,577,877
DIRT SCRAPING APPARATUS
Filed Oct. 2, 1945 3 Sheets-Sheet 2
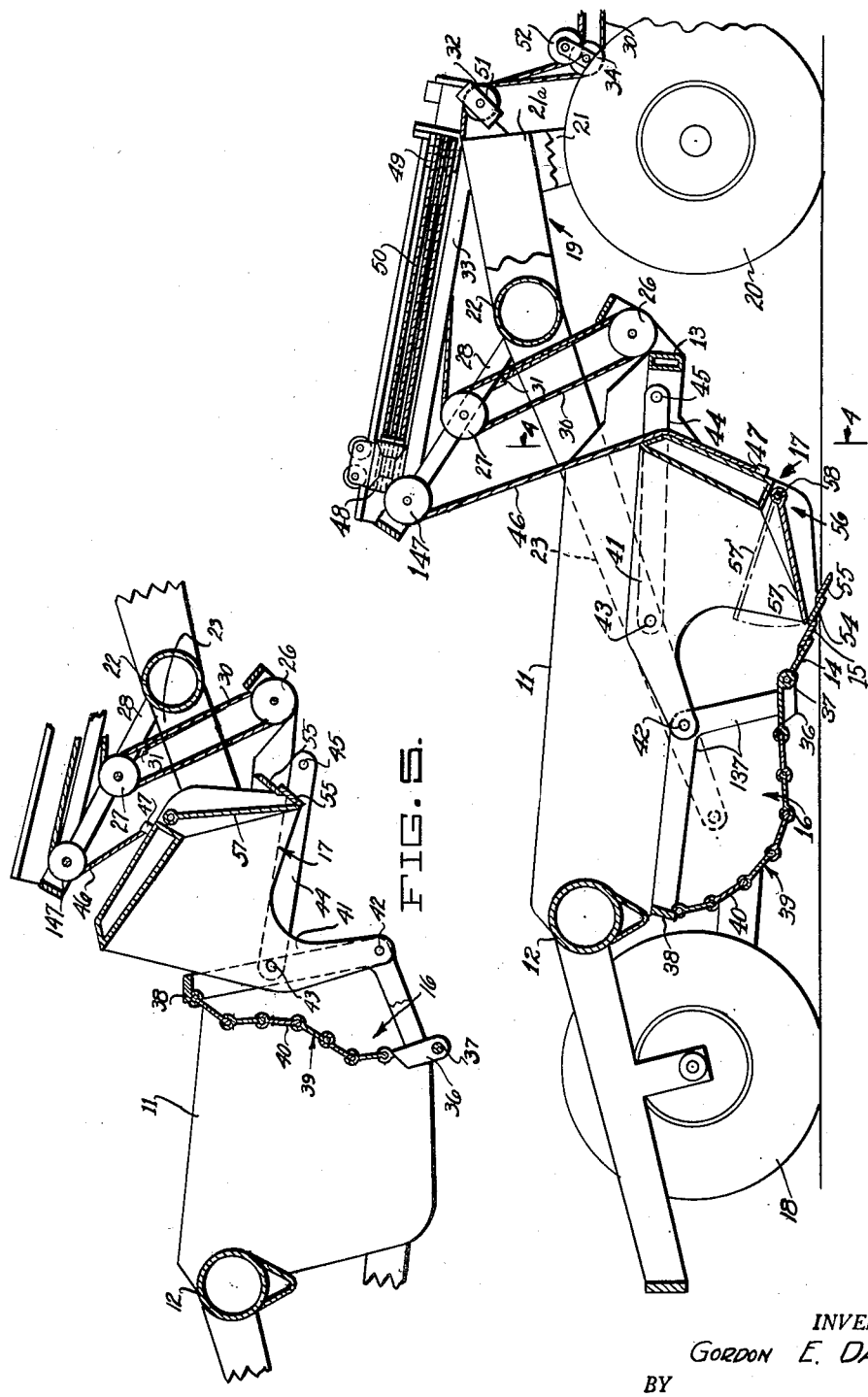
INVENTOR.
GORDON E. DANIELS
BY
*Fred N. Schwend*

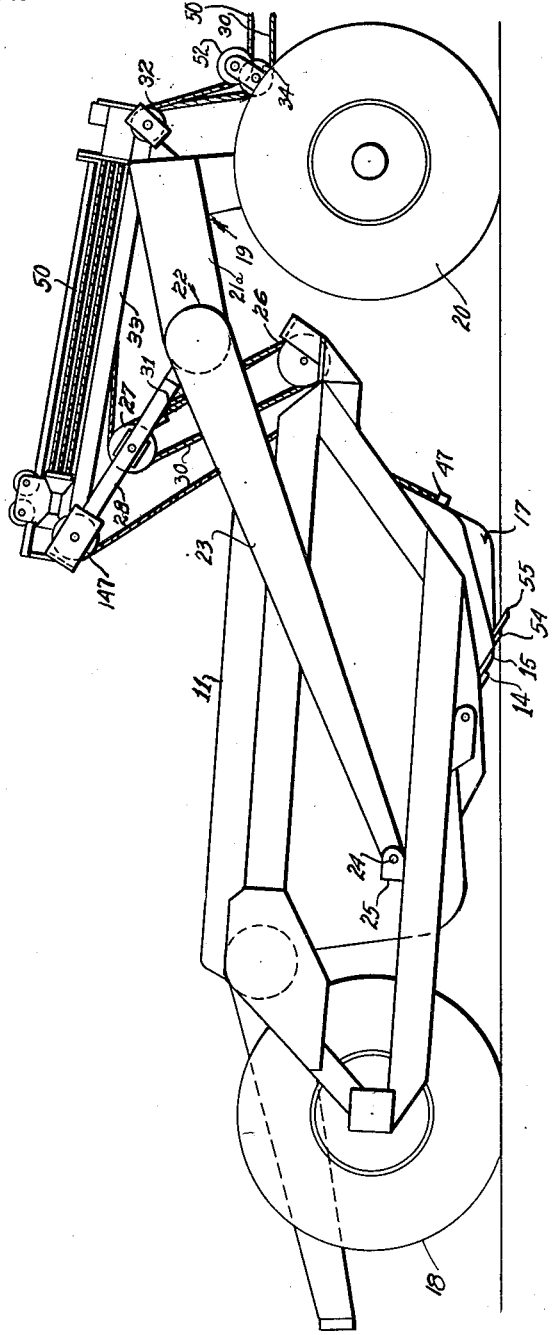

Dec. 11, 1951 G. E. DANIELS 2,577,877
DIRT SCRAPING APPARATUS
Filed Oct. 2, 1945 3 Sheets-Sheet 3
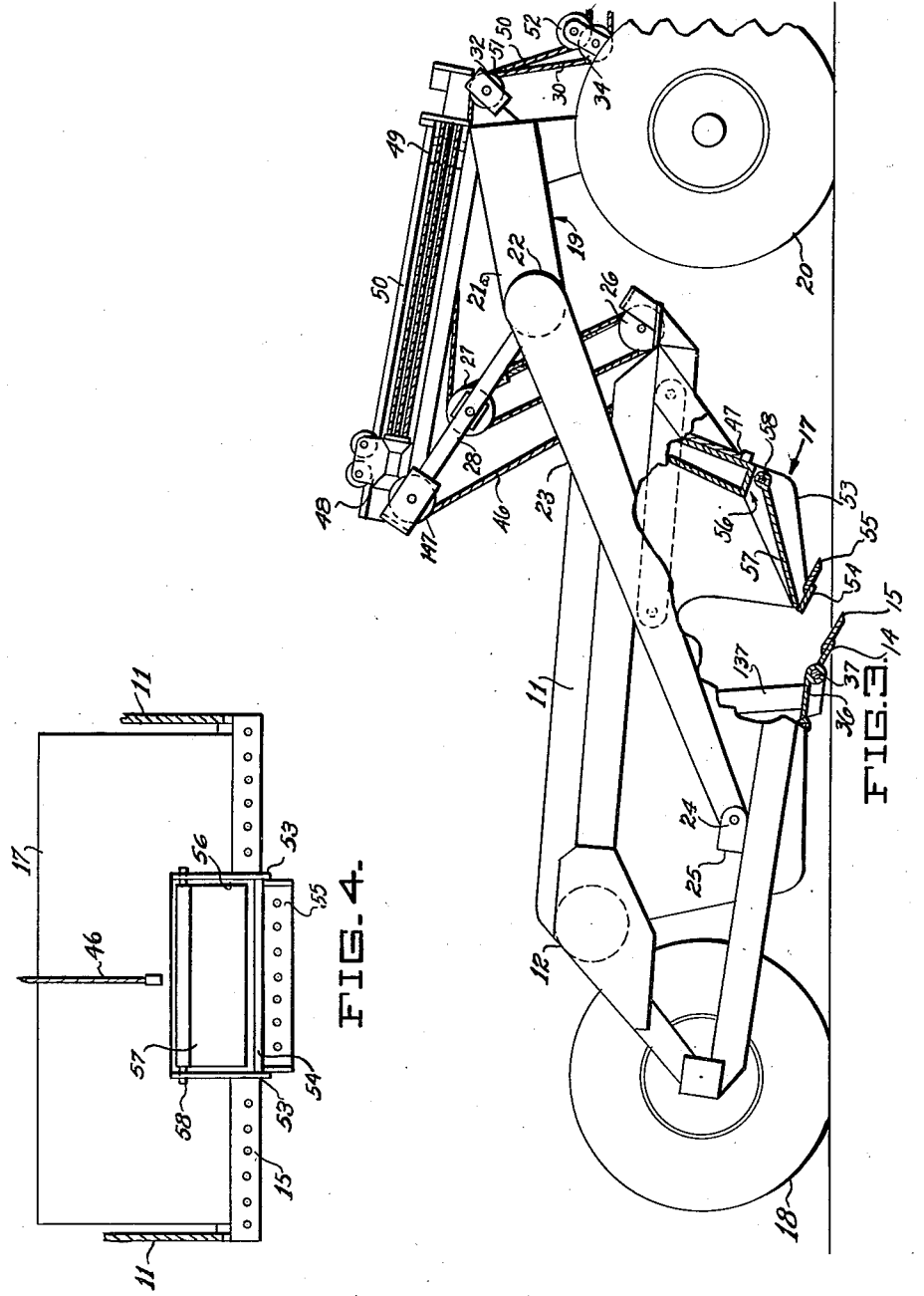
INVENTOR.
GORDON E. DANIELS
BY Patented Dec. 11, 1951

2,577,877

UNITED STATES PATENT OFFICE 2,577,877

DIRT SCRAPING APPARATUS

Gordon E. Daniels, Nashville, Tenn.

Application October 2, 1945, Serial No. 619,769

11 Claims. (Cl. 37—126)

This invention relates to dirt scrapers of the carry-all type wherein a scraper body comprising a scraping blade and a receptacle associated therewith is drawn along the ground. As the blade cuts into the material it directs the latter into the receptacle where it accumulates until the scraper is loaded to capacity.

In scrapers of the above type the scraping blade generally extends the entire width of the scraper so that the blade may be utilized to cut surfaces directly adjacent ledges and banks. Also, in such scrapers the tractive force required to pull the scraper during loading operations is very nearly proportional to the length of the scraper blade for any one type of material to be scraped. Some materials are sufficiently loose in texture to enable the scraper to be easily drawn with the usual tractive devices during scraping operations. However, other material, such as heavy clay soils, tax the ability of the tractive device to draw the scraper. Although this condition could be remedied by reducing the width of the scraper and its blade, any resort to this practice would render the scraper unstable laterally and would reduce the capacity of the scraper, while increasing the power of the tractive device would result in increased cost of equipment and operation.

A primary object of the present invention is to overcome the above mentioned difficulties.

Another object is to reduce the power requirements of a tractive device for a scraper of the above-named type.

A further object is to reduce the tendency of certain scraped materials to adhere to the sides of a material carrying receptacle during discharge of such material.

The manner in which the above and other objects of the invention are accomplished will be readily understood on reference to the accompanying drawings wherein:

Fig. 1 is a side elevational view of a dirt scraper embodying the present invention and illustrating the auxiliary scraping blade in scraping position.

Fig. 2 is a sectional view in side elevation of the scraper illustrating the same in the same condition as in Fig. 1.

Fig. 3 is a side elevational view, similar to that of Fig. 1, but partly in section, and illustrating the scraping blade in scraping position.

Fig. 4 is a sectional view taken substantially along the line 4—4 of Fig. 2.

Fig. 5 is a sectional view of part of the scraper, illustrating the same in a dirt discharging condition.

Referring to the drawings, the scraper comprises side frames 11 secured in spaced relationship by a tubular rear cross member 12, a front cross beam 13 and a lower mold board 14, the latter having a scraping blade 15 suitably secured thereto for the purpose of directing material scraped thereby upwardly into the scraper body, the latter being formed by the side frames 11, a rear bowl or receptacle 16 (Fig. 2) and a forward apron or second receptacle 17.

As shown in Fig. 4 the scraping blade 15 extends the entire width of the scraper whereby the scraper may be utilized to cut banks, ledges, etc.

The scraper body is supported at rear thereof by wheels 18 and at the front thereof by a yoke frame 19 mounted on a truck including steerable wheels 20.

The scraper is intended to be drawn forwardly (to the right in Figs. 1, 2 and 4) by a suitable tractor or other prime mover connected in any well known manner to the truck or the yoke frame 19.

The yoke frame 19 comprises a post 21 suitably connected at the lower end thereof to the truck comprising the wheels 20. The post 21 is integral with a yoke member 21a which, in turn, is integral with a tubular cross beam 22 to which are also rigidly fixed two arms 23 extending rearwardly adjacent and outside of the side walls 11 of the scraper. These arms terminate in pivotal connections 24 with brackets 25 forming part of the side frames 11.

The forward end of the scraper body is raised and lowered, whereby to vertically adjust the position of the scraper blade 15 relative to the ground, by a cable and sheave arrangement comprising a sheave 26 carried by the front cross beam 13 and a second sheave 27 carried by braces 28 extending upwardly from the tubular cross beam 22 and forming part of a truss for supporting various sheaves in fixed bodily relation with the yoke frame 19.

A cable 30 is suitably anchored at 31 to one of the braces 28 and is reeved several times around the sheave blocks 26 and 27, and then passes over a sheave 32 anchored at the forward end of a beam 33 forming part of the aforementioned truss. The latter beam is fastened at its rear end to the braces 28 and at its forward end to the yoke frame 19. From sheave 32, the cable passes under a sheave 34 suitably anchored to the post 21, from whence the cable is led to a suitable winch (not shown) driven by the tractor or other prime mover for the scraper and under control of the scraper operator.

The bowl 16 comprises a frame formed by a cross piece 36 pivotally mounted on a pivot bar 37 fixed to the sides of the scraper directly behind the mold board 14. Integrally attached to the piece 36 are right angled braces 137 located on opposite sides of the scraper, directly adjacent the side frames 11. A rear cross piece 38 is fixed to the braces 137, the latter forming an anchor for a flexible combined floor and back 39 the purpose of which will be explained hereinafter. The floor 39 is, in the present embodiment, formed of a plurality of inter-pivotally connected pieces 40 commercially known as "sheet piling."

Means are provided, under control of the scraper operator to locate the bowl 16 and apron 17 in different relative positions necessary to carry out different essential operations. The side plates 41 of the apron extend rearwardly and are pivotally connected at 42 to the braces 137 of the bowl 16. These plates 41 are also pivotally connected at 43 to links 44 which extend forwardly and are mounted on coaxially aligned pivot pins 45 fixed to the side frames 11.

For the purpose of raising and lowering the apron 17, a cable 46 is anchored at 47 to the apron and passes over a sheave 147 mounted on the above mentioned truss. The cable is attached to a travelling sheave block 48. The sheave block 48 coacts with a second stationary sheave block 49 through a cable 50 anchored to the sheave block 48. The cable is reeved several times around the sheaves of the sheave blocks 48 and 49 and thence passes over a sheave 51. Thereafter, the cable passes under a sheave 52 suitably anchored to the post 21 and is then led to a second winch or the like driven by the prime mover under control of the scraper operator.

It will be seen from the above that as the cable 50 is drawn forwardly the apron 17 will be raised rocking the latter about the pivots 42 while rocking the links 41 about pivots 45, the latter links serving to constrain a portion of the apron to describe an arc about the pivots 45.

Since the pivots 42, 43 and 45 are situated substantially in a straight line when the apron is in a "closed" position shown in Fig. 2, adjustment of the latter upwardly a small amount will not appreciably rock the rear bowl 16 clockwise of its position illustrated in Fig. 2, but as the apron 17 is raised a greater amount the bowl 16 will be swung clockwise thereby a correspondingly greater amount. The basic elements and relationships of the above mentioned inter-connections between the rear bowl and apron are disclosed and claimed in my copending application Serial No. 520,167, filed January 29, 1944, and since matured into Patent No. 2,425,601, issued on August 12, 1947.

Referring in particular now to Fig. 4, it will be noted that the apron 17 has a rectangular opening 56 formed in the lower central portion thereof, which opening is bordered by a pair of vertically extending plates 53 integrally attached to the apron. An auxiliary mold board 54 (see Fig. 3) is integrally attached to the plates 53 and an auxiliary scraping blade 55 which is considerably shorter than the main blade 15 is suitably secured to the latter mold board.

The opening 56 is normally closed by a closure panel 57 freely pivoted at 58 on the plates 53.

It will be noted that when the apron 17 is lowered to its fullest extent, as shown in Fig. 2 the auxiliary scraping blade 55 will be positioned considerably below the main scraping blade 15 and it and its mold board 54 will directly overlie the scraping blade 15. Therefore, when it is desired, because of the texture of the ground or for any other purpose to use the shorter auxiliary blade the apron is lowered to its position illustrated in Fig. 2 by means of the cable 50 while the cable 30 is manipulated to position the scraper body in its relative location illustrated in Fig. 2 wherein the auxiliary blade 55 extends into scraping contact with the ground. Now, as the scraper is drawn forwardly only the auxiliary blade 55 will become effective to direct material into the scraper and because of its materially shorter length the draw bar pull required will be proportionally smaller.

It will be noted that the closure panel 57 tends to close the opening 56 by virtue of its own weight. However, as dirt is being directed into the scraper body by the blade 55, the panel 57 is raised, for example, as indicated by the dot and dash lines 57' permitting the entrance of the dirt, while preventing the dirt already in the body to spill outwardly over the blade. At the same time the remainder of the lower portion of the apron 15 will close or substantially close off the opening over the remainder of the scraping blade 15. When the scraper is raised, the dirt remaining within the gap between the panel 57 and the auxiliary blade 55 will tend to spill outwardly permitting the panel to close and thence retain the remainder of the dirt so that in this condition the dirt may be transported from one place to another without further spillage.

However, in the event that the texture of the ground is such as to permit the longer blade 15 to be utilized or when it is desired to cut directly adjacent a bank, ledge or the like, the apron 17 is raised, for example, to the position illustrated in Fig. 3 wherein its blade 55 will now be located a considerable extent above the blade 15 while an opening will be formed above blade 15 to permit dirt to be directed upwardly into the body by the blade 15. In this condition of the apron, the scraper body is adjusted until the blade 15 assumes scraping contact with the ground.

Describing now the discharging operation, the cable 30 is first adjusted to position the scraping blade 15 at a suitable height above the ground. Thereafter, the cable 50 is drawn forward, raising the apron 17. By reason of the toggle action of the pivotal connections formed between the bowl and the apron, the bowl 16 is rocked clockwise from its position illustrated in Fig. 2. As the bowl and apron reach their extreme limits of movement under the action of cable 30 they assume positions illustrated, for example, in Fig. 5 enabling the accumulated material previously carried thereby to be totally discharged. It will be seen that as the bowl 16 is rocked from the position illustrated in Fig. 2 to that illustrated in Fig. 5, the flexible floor 39 will weave in a manner tending to break up and dislodge any sticky material clinging to its surface.

Having thus described the invention what I desire to secure by United States Letters Patent is:

1. In a scraping apparatus, the combination of a scraper body adapted to be moved along the ground and comprising a receptacle having an opening therein to receive material; a pair of juxtaposed scraping blades in said opening, each of said blades being adapted to direct material scraped thereby through said opening and into said body during forward movement of said body, one of said blades having a length greater than the other, and means for selectively moving one of said blades vertically relatively to the other whereby to cause either of said blades to direct material into said receptacle during movement of said body and for rendering the other of said blades ineffective.

2. In a scraping apparatus, the combination of a scraper body adapted to be moved along the ground and comprising a receptacle; a pair of juxtaposed scraping blades, one of said blades being of shorter length than the other, each of said blades being adapted to direct material scraped thereby into said body during forward movement of said body and means for selectively moving one of said blades vertically relative to the other whereby to position either of said blades in contact with the ground to direct material into said receptacle during movement of said body and for positioning the other of said blades out of contact with the ground.

3. In a scraping apparatus, the combination of a scraper body adapted to be moved along the ground and comprising a receptacle; a scraping blade carried by said body, an apron associated with said receptacle, a second scraping blade carried by said apron, said second blade being of shorter length than said first mentioned blade, said blade being adapted to direct material scraped thereby into said body during forward movement of said body and means for selectively lowering either said body or said apron to position said respective blade in contact with the ground whereby to direct material into said receptacle during movement of said body, said apron being arranged to locate said second blade in juxtaposition with said first mentioned blade when said second blade is positioned to direct material into said receptacle.

4. In a scraping apparatus, the combination of a scraper body adapted to be moved along the ground and comprising a receptacle; a scraping blade carried by said body, an apron associated with said receptacle, a second scraping blade carried by said apron, said second blade being of shorter length than said first mentioned blade, each of said blades being adapted to direct material scraped thereby into said body during forward movement of said body, means for selectively lowering either said body or said apron to position said respective blade in contact with the ground whereby to direct material into said receptacle during movement of said body, said apron being arranged to locate said second blade in juxtaposition with said first mentioned blade when said second blade is positioned to direct material into said receptacle and a closure device freely and pivotally suspended by said apron and overlying said second blade for preventing material from moving out of said receptacle and over said second blade during scraping operations.

5. In a scraping apparatus, the combination of a scraper body adapted to be moved along the ground, a scraping blade carried by said body, a second scraping blade of different length than said first mentioned blade, each of said blades being adapted to direct material scraped thereby into said body during forward movement of said body, means for guiding said second blade toward and away from substantially overlapping relation to said first mentioned blade, and means for selectively positioning said second blade in substantially overlapping relation to said first mentioned blade or spaced apart therefrom.

6. In a scraping apparatus, the combination of a scraper body adapted to be moved along the ground, a scraping blade carried by said body, an apron ssociated with said body, a second scraping blade carried by said apron, each of said blades being adapted to direct material scraped thereby into said body during forward movement of said body, and means for selectively positioning said apron with said second blade substantially overlapping said first mentioned blade or with said second blade spaced apart from said first mentioned blade.

7. In a scraping apparatus, the combination of a scraper body adapted to be moved along the ground, a scraping blade carried by said body, an apron associated with said body, a second scraping blade carried by said apron, each of said blades being adapted to direct material scraped thereby into said body during forward movement of said body, one of said blades being of a length shorter than the other, and means for selectively positioning said apron with said second blade substantially overlapping said first mentioned blade or with said second blade spaced apart from said first mentioned blade.

8. In a scraping apparatus, the combination of a scraper body adapted to be moved along the ground, a scraping blade carried by said body, an apron associated with said body, a second scraping blade carried by said apron, each of said blades being adapted to direct material scraped thereby into said body during forward movement of said body, means for positioning said apron with said second blade substantially overlapping said first mentioned blade, one of said blades being of a length shorter than the other, and said apron having a portion adapted to prevent spilling of scraped material out of said receptacle and over the portion of said first blade not overlapped by said second blade.

9. In a scraping apparatus, the combination of a scraper body adapted to be moved along the ground, a scraping blade carried by said body, an apron associated with said body, a second scraping blade carried by said apron, each of said blades being adapted to direct material scraped thereby into said body during forward movement of said body, means for selectively positioning said apron with said second blade subtantially overlapping said first mentioned blade or with said second blade spaced apart from said first mentioned blade, and means carried by said apron for preventing scraped material from moving out of said receptacle and over said second blade.

10. In a scraping apparatus, the combination of a scraper body adapted to be moved along the ground, an apron associated with said body, a scraping blade carried by said apron and of shorter length than said apron, each of said blades being adapted to direct material scraped thereby into said body during forward movement of said body, and means for selectively positioning said apron with said blade arranged to direct material scraped thereby into said body or with said blade rendered ineffective to engage the ground, said apron having portions adapted to coact with said body to prevent spilling of scraped material out of said receptacle at locations beyond said second blade when said apron is in said first mentioned position.

11. In a scraping apparatus, the combination of a scraper body adapted to be moved along the ground, a scraping blade carried by said body, means for positioning said body to cause said blade to engage the ground, an apron associated with said body, a second scraping blade carried by said apron and of shorter length than said first mentioned blade, each of said blades being adapted to direct material scraped thereby into said body during forward movement of said body and means for selectively positioning said apron with said second blade arranged to direct material scraped thereby into said body and for positioning said apron with said second blade ineffective to engage the ground, said apron having portions adapted to coact with said body to prevent spilling of scraped material out of said receptacle at locations beyond said second blade when said apron is in said first mentioned position.

GORDON E. DANIELS.

REFERENCES CITED

The following references are of record in the file of this patent:

UNITED STATES PATENTS

| Number | Name | Date |
| --- | --- | --- |
| 75,783 | Nichols | Mar. 24, 1868 |
| 885,049 | Holcomb | Apr. 21, 1908 |
| 1,074,536 | Alexander | Sept. 30, 1913 |
| 2,083,307 | Schultz | June 8, 1937 |
| 2,112,288 | Heil | Mar. 29, 1938 |
| 2,164,461 | LeBleu | July 4, 1939 |
| 2,250,289 | Barrett | July 22, 1941 |
| 2,306,066 | LeBleu | Dec. 22, 1942 |
| 2,329,831 | Ferguson | Sept. 21, 1943 |
| 2,396,287 | Robb | Mar. 12, 1946 |